US012602009B2

(12) United States Patent
Fiammingo

(10) Patent No.: US 12,602,009 B2
(45) Date of Patent: Apr. 14, 2026

(54) CONNECTING RING FOR A TIMEPIECE DIAL, PLATE AND TIMEPIECE DIAL, ASSEMBLY METHOD

(71) Applicant: ROLEX SA, Geneva (CH)

(72) Inventor: Daniel Fiammingo, Sciez (FR)

(73) Assignee: ROLEX SA, Geneva (CH)

( * ) Notice: Subject to any disclaimer, the term of this patent is extended or adjusted under 35 U.S.C. 154(b) by 649 days.

(21) Appl. No.: 17/779,404

(22) PCT Filed: Sep. 10, 2020

(86) PCT No.: PCT/EP2020/075373
§ 371 (c)(1),
(2) Date: May 24, 2022

(87) PCT Pub. No.: WO2021/104698
PCT Pub. Date: Jun. 3, 2021

(65) Prior Publication Data

US 2023/0013124 A1 Jan. 19, 2023

(30) Foreign Application Priority Data

Nov. 26, 2019 (EP) .................................... 19211399

(51) Int. Cl.
*G04B 19/14* (2006.01)
*G04B 19/06* (2006.01)

(52) U.S. Cl.
CPC ........... *G04B 19/14* (2013.01); *G04B 19/065* (2013.01)

(58) Field of Classification Search
CPC ....... G04B 19/14; G04B 19/06; G04B 19/065
See application file for complete search history.

(56) References Cited

U.S. PATENT DOCUMENTS 364,109 A 5/1887 Hart
1,059,203 A 4/1913 Pettersen
(Continued)

FOREIGN PATENT DOCUMENTS

CH 330907 A 6/1958
CH 696987 A5 2/2008
(Continued)

OTHER PUBLICATIONS

Chinese Office Action and Search Report dated Oct. 30, 2023 in counterpart application No. CN 202080082581.1; with English machine translation (total 13 pages) (note: JP2001194470, D2 cited in the CN Office Action (D4 cited in the CN Search Report) and CH709401 and JPS51-25149, D2 and D8 cited in the CN Search Report, are not listed in this IDS since they are already of record).
(Continued)

*Primary Examiner* — Edwin A. Leon
*Assistant Examiner* — Jason M Collins
(74) *Attorney, Agent, or Firm* — Seckel IP, PLLC

(57) ABSTRACT

Connecting ring (2) for a dial (10) of a timepiece (90) having a first connecting portion (21) provided with plastically deformable connecting elements (210) that are intended to press against a second portion (11) formed on a dial plate (1), the dial plate having a lower first surface (12) that is intended to be positioned on the inner side of a timepiece (90) and an upper second surface (13) that is opposite and is intended to be visible, the second portion (11) connecting the first and second surface and forming a peripheral contour of the dial plate.

11 Claims, 7 Drawing Sheets

(56) References Cited

U.S. PATENT DOCUMENTS

| | | | | |
|---|---|---|---|---|
| 3,545,197 | A | 12/1970 | Fischer | |
| 5,699,324 | A * | 12/1997 | Perrot | G04B 19/14 368/294 |
| 5,912,064 | A | 6/1999 | Azuma et al. | |
| 6,021,099 | A | 2/2000 | Aoki et al. | |
| 6,053,631 | A | 4/2000 | Mock et al. | |
| 6,170,982 | B1 * | 1/2001 | Graber | G04B 37/0025 368/319 |
| 6,762,976 | B1 | 7/2004 | Tamaru et al. | |
| 6,799,886 | B2 * | 10/2004 | Carrard | G04B 19/283 368/295 |
| 9,066,564 | B2 * | 6/2015 | Tsukamoto | G04B 37/00 |
| 9,284,485 | B2 * | 3/2016 | Berner | C04B 35/62655 |
| 9,348,314 | B2 | 5/2016 | Robin | |
| 9,535,403 | B2 | 1/2017 | Tschumi | |
| 9,920,245 | B2 | 3/2018 | Berner et al. | |
| 10,196,566 | B2 | 2/2019 | Berner et al. | |
| 2003/0012086 | A1 | 1/2003 | Gressly et al. | |
| 2011/0044138 | A1 | 2/2011 | Danthe et al. | |
| 2012/0236693 | A1 | 9/2012 | Hiranuma | |
| 2014/0124702 | A1 | 5/2014 | Berner et al. | |
| 2014/0160905 | A1 | 6/2014 | Robin | |
| 2015/0212491 | A1 | 7/2015 | Tschumi | |
| 2015/0252260 | A1 | 9/2015 | Berner et al. | |
| 2016/0137919 | A1 | 5/2016 | Berner et al. | |
| 2018/0173163 | A1 | 6/2018 | Kraehenbuehl | |
| 2018/0305260 | A1 | 10/2018 | Boccard et al. | |
| 2019/0391533 | A1 | 12/2019 | Barfuss et al. | |
| 2021/0034018 | A1 | 2/2021 | Jeanrenaud et al. | |
| 2021/0157273 | A1 | 5/2021 | Bourg et al. | |
| 2022/0348505 | A1 | 11/2022 | Boccard et al. | |

FOREIGN PATENT DOCUMENTS

| | | | |
|---|---|---|---|
| CH | 705042 | A2 | 11/2012 |
| CH | 709401 | A2 | 9/2015 |
| CN | 1397853 | A | 2/2003 |
| CN | 101809513 | A | 8/2010 |
| CN | 102681421 | A | 9/2012 |
| CN | 106164785 | A | 11/2016 |
| EP | 0819995 | A1 | 1/1998 |
| EP | 2730636 | A1 | 5/2014 |
| EP | 2743783 | A1 | 6/2014 |
| EP | 3339970 | A1 | 6/2018 |
| GB | 1486059 | A | 9/1977 |
| JP | S51-9871 | A | 1/1967 |
| JP | S51-47262 | U | 4/1976 |
| JP | S51-25149 | B1 | 7/1976 |
| JP | S58-17579 | U | 2/1983 |
| JP | H10160861 | A | 6/1998 |
| JP | 2001-194470 | A | 7/2001 |
| JP | 2004191372 | A | 7/2004 |
| JP | 2005349666 | A | 12/2005 |
| JP | 2012189459 | A | 10/2012 |
| JP | 2017506755 | A | 3/2017 |
| JP | 2018179996 | A | 11/2018 |
| WO | 199631810 | A1 | 10/1996 |

OTHER PUBLICATIONS

Notice of Allowance dated May 16, 2024 in co-pending U.S. Appl. No. 16/951,611; with PTO892, without returned SB08 (total 8 pages).

Chinese Office Action and Search Report dated Feb. 27, 2024 in application No. CN 202011345235.6, counterpart of. Co-pending U.S. Appl. No. 16/951,611 and of this application; with English machine translation (total 15 pages) (note: D1-D4 cited in the CN Office Action, D1-D6 and D8 in the CN Search Report, are not listed in this IDS since they are already of record).

JP Office Action dated Oct. 8, 2024 in counterpart application No. JP 2022-530651; with English machine translation (total 12 pages).

JP Office Action dated Oct. 15, 2024 in counterpart application No. JP 2020-192233 of co-pending U.S. Appl. No. 16/951,611; with English machine translation (total 8 pages).

EP Office Action dated Jul. 27, 2023 in application No. EP20208563.5, counterpart of co-pending U.S. Appl. No. 16/951,611; with English machine translation (total 17 pages).

Office Action dated Aug. 28, 2023 in co-pending U.S. Appl. No. 16/951,611; with PTO892, without returned SB08 (total 12 pages).

International Search Report and Written Opinion dated Dec. 2, 2022 in corresponding application No. PCT/EP2020/075373; with English partial translation and partial machine translation (total 17 pages).

European Search Report and Written Opinion dated May 20, 2020 in priority application No. EP19211399.1 of co-pending U.S. Appl. No. 16/951,611; with English machine translation (total 12 pages) (note: D1-D4 cited in the European Search Report are not listed in this IDS since they are already on another IDS form).

Extended European Search Report and Written Opinion dated Mar. 22, 2021 in counterpart EP application No. EP20208563.5 of co-pending U.S. Appl. No. 16/951,611; with English machine translation (total 16 pages) (note: D1-D5 cited in the Extended European Search Report are not listed in this IDS since they are already listed on another IDS form).

Chinese Office Action and Search Report dated Feb. 27, 2024 in application No. CN 202011345235.6, counterpart of co-pending U.S. Appl. No. 17/401,540, now U.S. Pat. No. 11,638,467; with English machine translation (total 15 pages) (note: D1-D4 cited in the CN Office Action, D1-D6 and D8 in the CN Search Report, are not listed in this IDS since they are already of record).

JP Office Action dated Jun. 3, 2025 in counterpart application No. JP 2022-530651; with English machine translation (total 10 pages) (note: D3-D6 cited in the JP Office Action are not listed in this IDS since they are already of record in this application).

* cited by examiner

CONNECTING RING FOR A TIMEPIECE DIAL, PLATE AND TIMEPIECE DIAL, ASSEMBLY METHOD

BACKGROUND ART

The invention relates to a connecting ring for a timepiece dial. The invention also relates to a timepiece dial plate. The invention also relates to a timepiece dial comprising such a ring and/or such a plate. The invention also relates to a timepiece comprising such a dial and/or such a ring and/or such a plate. The invention further relates to a method for assembling or constructing such a timepiece or such a dial.

A dial for a timepiece according to the prior art is described in document EP3339970. Such a dial comprises feet welded beneath a dial plate and intended for fixing the dial plate into a case of a timepiece, for example using screws. This solution has the disadvantage of requiring a material that is compatible with welding from which to form the dial, while at the same time requiring painstaking manufacturing and assembly operations, notably the welding of the feet and then screw-fastening into a frame. Furthermore, there is the risk of generating a situation of hyperstatism if the precision of assembly is imperfect. Finally, this solution is incompatible with certain timepieces for which the volume available is very restricted and limits the passage of screws for securing the dial, for example in the case of wrist watches equipped with multiple mechanical functionalities.

SUMMARY OF THE INVENTION

It is an object of the invention to provide a timepiece dial connecting ring and/or a timepiece dial plate able to improve the devices known from the prior art. In particular, the invention proposes simple and robust devices for allowing reliable and repeatable fixing of a timepiece dial plate to a connecting ring.

A connecting ring according to the invention is defined in point 1 below.

1. A connecting ring for a dial of a timepiece comprising a connecting first portion provided with connecting elements that are plastically deformable and intended to come to bear against a second portion formed on a dial plate, the dial plate comprising:
   a lower first surface intended to be positioned on the inward side of a timepiece,
   an opposite upper second surface intended to be visible,
   the second portion connecting the first and second surface and forming a peripheral contour of the dial plate.

Various embodiments of the ring are defined in points 2 to 5 below.

2. The connecting ring as defined in the preceding point, wherein the connecting elements comprise tongues or annulus portions.
3. The connecting ring as defined in either of the preceding points, wherein the connecting elements comprise feet, notably feet that are bored and/or shaped in such a way as to be deformed by forming a riveted joint.
4. The connecting ring as defined in one of the preceding points, wherein the ring is made of metal or a metal alloy, notably of brass or of an alloy of gold or of steel, and/or wherein the ring has a Vickers hardness of less than 180 HV, or even less than 150 HV, or even less than 100 HV and/or wherein the connecting elements are intended to come to be against a third surface that is inclined with respect to the lower first surface and/or with respect to the upper second surface of the dial plate.
5. The connecting ring as defined in one of the preceding points, wherein said ring comprises a skirt comprising at least one elastic element for connection to a time piece movement, the at least one elastic element adopting for example the form of a blade that is embedded at both ends.

A dial plate according to the invention is defined in point 6 below.

6. A dial plate for a dial of a timepiece and which is intended to be mounted on a connecting ring, notably a connecting ring as defined in one of points 1 to 5, the dial plate comprising:
   a lower first surface intended to be positioned on the inward side of a timepiece,
   an opposite upper second surface intended to be visible,
   a second portion connecting the first and second surface and forming a peripheral contour of the dial plate,
   the second portion comprising at least a third surface that is inclined with respect to the lower first surface and/or with respect to the upper second surface of the dial plate, the at least one third surface being designed to collaborate with connecting elements that are plastically deformable and intended to come to bear against said at least one third surface.

Various embodiments of the plate are defined in points 7 to 10 below.

7. The dial plate as defined in the preceding point, wherein the at least one third surface is inclined by an angle $\alpha$ with respect to the lower first surface and/or with respect to the upper second surface of the dial plate, where $\alpha$ is comprised between 20° and 70°, and for example $\alpha$ is equal to 60°.
8. The dial plate as defined in point 6 or 7, wherein the at least one third surface comprises several surfaces formed in notches made in the second portion of the plate.
9. The dial plate as defined in one of points 6 to 8, wherein the at least one third surface comprises at least a frustoconical surface, notably a frustoconical surface formed in a lug or lobe projecting from a peripheral contour, particularly a circular contour, of the plate.
10. The dial plate as defined in one of points 6 to 9, wherein the plate is made from a ceramic-based material, particularly:
    a zirconia or an alumina, or
    a fluorescent and/or phosphorescent ceramic, or
    a composite ceramic based on yttrium-stabilized zirconia and Dy/Eu-doped strontium aluminate, or
    a luminescent zirconia,
    and/or wherein the plate is made of a material based on a composite material,
    and/or wherein the plate is based on a stone, notably onyx, opal, turquoise or sapphire, or based on mother-of-pearl and/or wherein the plate has a Vickers hardness higher than 600 HV, or even higher than 700 HV, or even higher than 800 HV.

A dial according to the invention is defined in point 11 below.

11. A dial comprising a dial plate as defined in one of point 6 to 10 and a connecting ring as defined in one of points 1 to 5, the dial plate being assembled with the connecting ring.

Various embodiments of the dial are defined in points 12 and 13 below.

12. The dial as defined in the preceding point, wherein the ratio of the Vickers hardness of the material of which the dial plate is made to the Vickers hardness of the material of which the connecting ring is made is greater than 3, or even greater than 4, or even greater than 5.
13. The dial as defined in point 11 or 12, wherein the dial plate and the connecting ring are configured and/or arranged in such a way that after the plastic deformation of the plastically deformable connecting elements, the plastically deformable connecting elements do not extend beyond the upper second surface.

A timepiece according to the invention is defined in point 14 below.

14. A timepiece comprising a dial as defined in one of points 11 to 13.

A method of assembling a dial according to the invention is defined in point 15 below.

15. A method of assembling a dial as defined in one of points 11 to 13 or a timepiece as defined in point 14, the method comprising the following steps:
    - supplying a dial plate as defined in one of points 6 to 10,
    - supplying a connecting ring as defined in one of points 1 to 5,
    - placing the dial plate on the connecting ring,
    - plastically deforming the connecting elements.

BRIEF DESCRIPTION OF THE FIGURES

The attached drawings depict, by way of examples, two embodiments of a timepiece.

DETAILED DESCRIPTION OF PARTICULAR EMBODIMENTS

Figure 1:
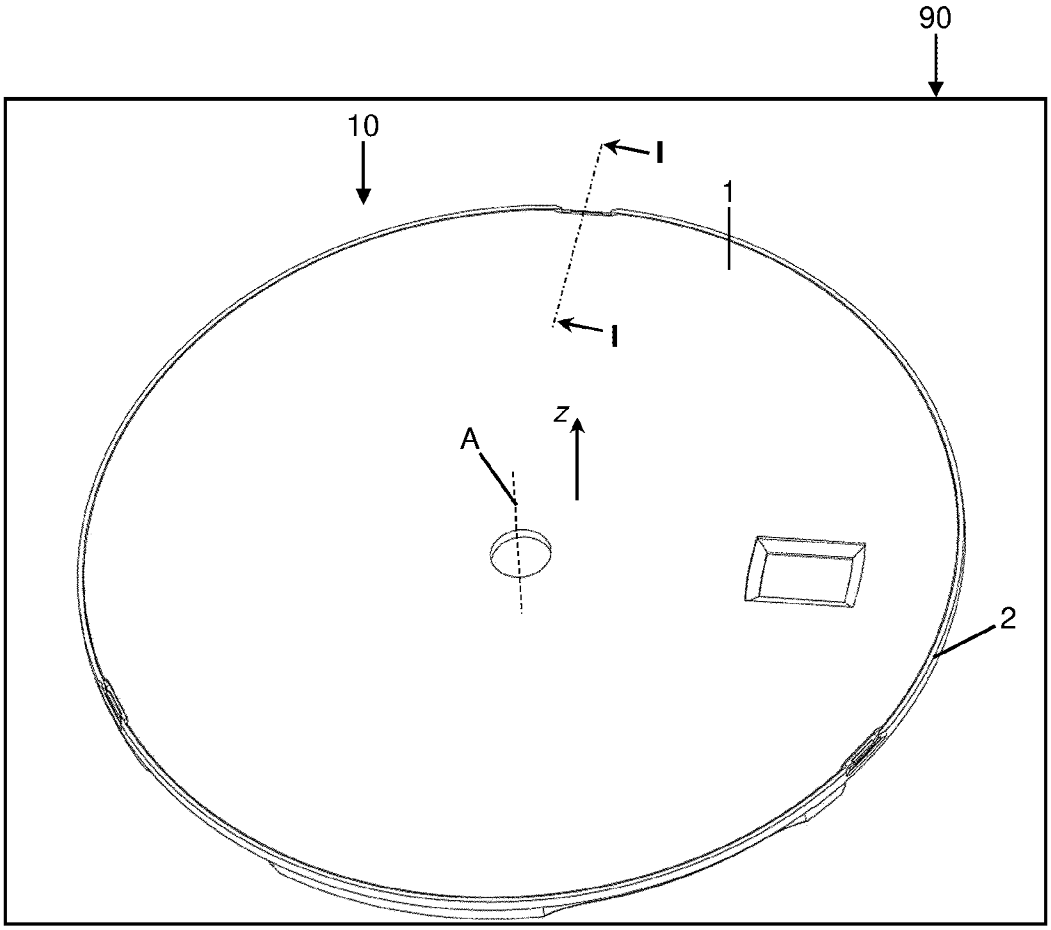
FIG. 1 is a view of a first embodiment of a timepiece.
Figure 2:
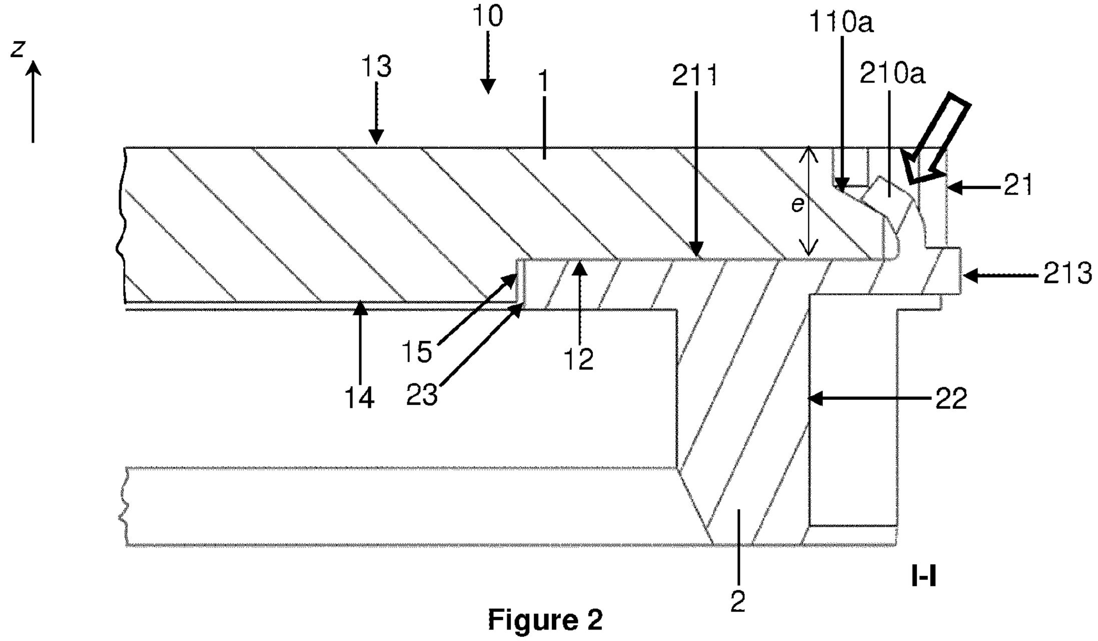
FIG. 2 is a detailed view in axial section of a dial of the first embodiment.
Figure 3:
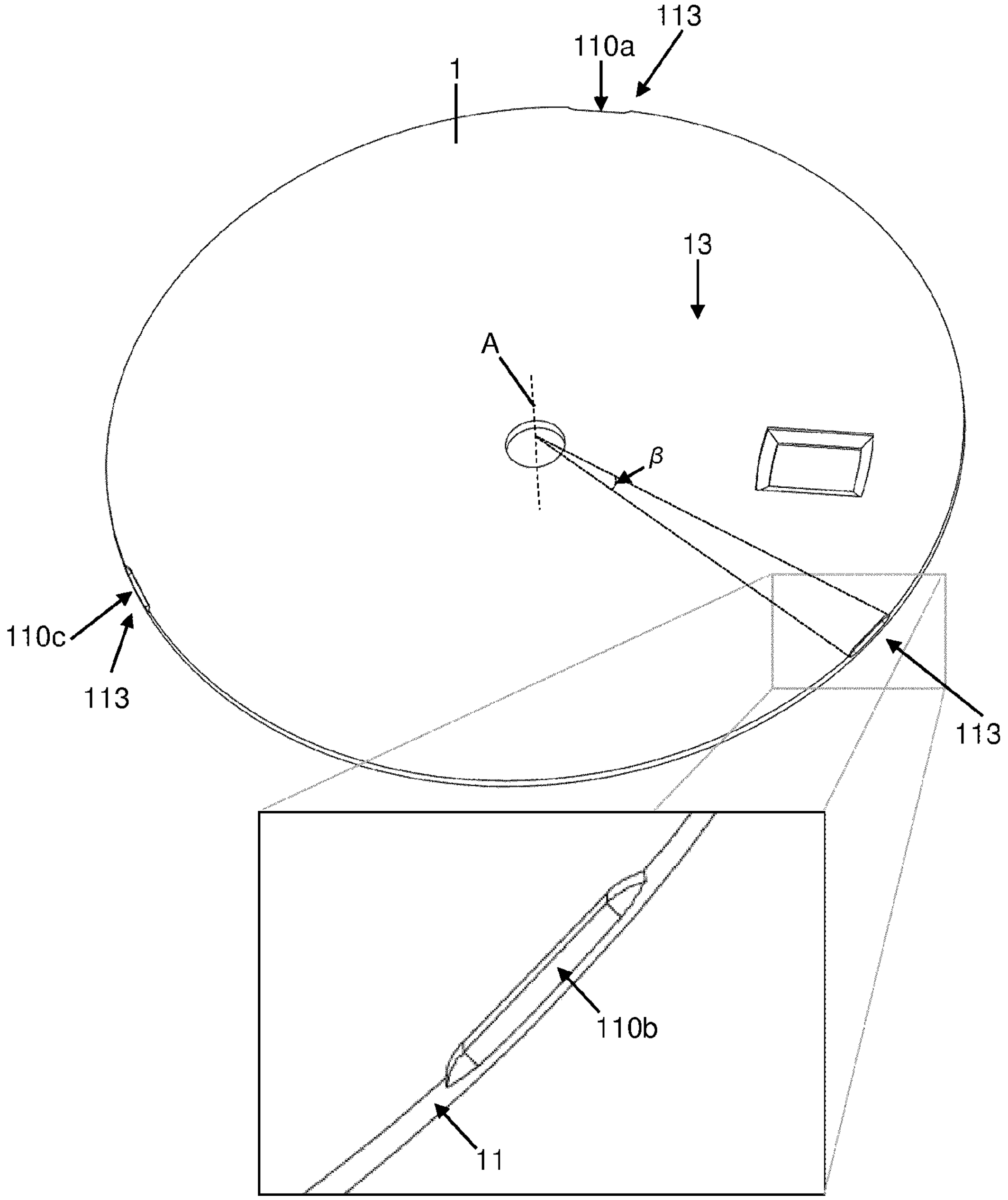
FIG. 3 is a perspective view of a dial plate of the first embodiment.

A first embodiment of a timepiece 90 is described hereinafter with reference to FIGS. 1 to 7.

The timepiece 90 is, for example, a watch, particularly a wrist watch.

The timepiece 90 comprises a timepiece movement 30 and a timepiece dial 10 that are intended to be mounted in a timepiece case in order to protect them from the external environment.

The timepiece movement 30 may be an electronic movement or a mechanical movement, notably an automatic movement.

The timepiece dial 10 comprises a dial plate 1 and a connecting ring 2 for connecting the dial 10. The dial plate 1 is assembled on the connecting ring 2 by riveting and/or by setting. The connecting ring 2 is intended to connect the dial plate 1 to the movement 30, particularly to a movement blank 3 of the movement 30.

The dial plate 1 and the connecting ring 2 are shaped to be mechanically connected or fixed to one another. In other words, the dial plate 1 and the connecting ring 2 are preferably shaped to be connected as a built-in connection or a complete connection.

The connecting ring in other words constitutes a connecting support or a connecting interface between the movement and the dial plate.

What we mean by a "mechanical connection" is any connection performed independently of a step of bonding, welding or else brazing, which may prove tricky and difficult to reproduce.

The connecting ring 2 for a dial 10 of a timepiece 90 comprises a connecting first portion 21 provided with connecting elements 210 that are plastically deformable and intended to come to bear against a second portion 11 formed on the dial plate 1.

As for the dial plate 1 for a dial 10 of a timepiece 90, this is intended to be mounted on the connecting ring 2. The dial plate comprises:

- a lower first surface 12, intended to be positioned on the inward side of the timepiece 90;
- an opposite upper second surface 13 intended to be visible,
- a second portion 11 connecting the first and second surface and forming a peripheral contour of the dial plate.

The second portion 11 comprises at least a third surface 110 that is inclined with respect to the lower first surface 12 and/or with respect to the upper second surface 13 of the dial plate 1. The at least one third surface **110*a* is designed to collaborate with connecting elements 210 that are plastically deformable and intended to come to bear against the at least one third surface 110**.

The timepiece dial here has an axis A. This axis is an axis of revolution or of symmetry of the dial. The axis A is oriented in a direction z perpendicular to the dial plate. If the dial has a shape that is not symmetrical or of revolution, the axis A passes through the center of the dial (defined by a center of mass). If the dial plate is non planar, the direction z and the axis A are perpendicular to a plane passing through the lower first surface or the upper second surface. For example, such a plane may be tangential to the lower first surface or to the upper second surface. For example, such a plane may pass through the periphery of the lower first surface or through the periphery of the upper second surface.

The bearing of the plastically deformable connecting elements 210 against the second portion 11 formed on the dial plate 1, particularly on the at least one third surface 110, makes it possible to achieve mechanical connection of the plate to the connecting ring.

More specifically, the connecting portion 21 is provided with connecting elements 210 intended to come to bear against third surfaces 110 formed on the peripheral contour 11 of the dial plate 1. The peripheral contour 11 may be defined as being a surface connecting the first surface 12 that is intended to be positioned on the inward side of a timepiece and an opposite upper second surface 13 that is intended to be visible by the wearer of the timepiece.

The third surfaces 110 are inclined, which is to say that the directions normal to at least portions of these surfaces are neither parallel nor perpendicular to the axis A.

The third surfaces 110 extend in a direction not perpendicular to the first surface 12 and are inclined toward the inside of the dial plate 1 from said first surface 12. In other words, progression along the third surfaces 110 with increasing distance away from the first surface 12 and/or with decreasing distance away from the second surface 13, decreases the distance from the axis A or from the center of the first surface 12 or decreases the distance from the axis A or from the center of the second surface 13 (this decrease being measured parallel to the first surface 12 or parallel to the second surface 13).

In the first embodiment, the connecting elements 210 of the ring 2 take the form of tongues. More specifically, the connecting elements 210 of the ring 2 take the form of tongues formed by annulus portions.

The connecting portion 21 takes the form of an annulus portion. It projects, in the vertical direction z, from a horizontal or substantially horizontal support surface 211 intended to have a lateral part or peripheral part of the lower first surface 12 of the dial plate 1 bearing against it.

Figure 5:
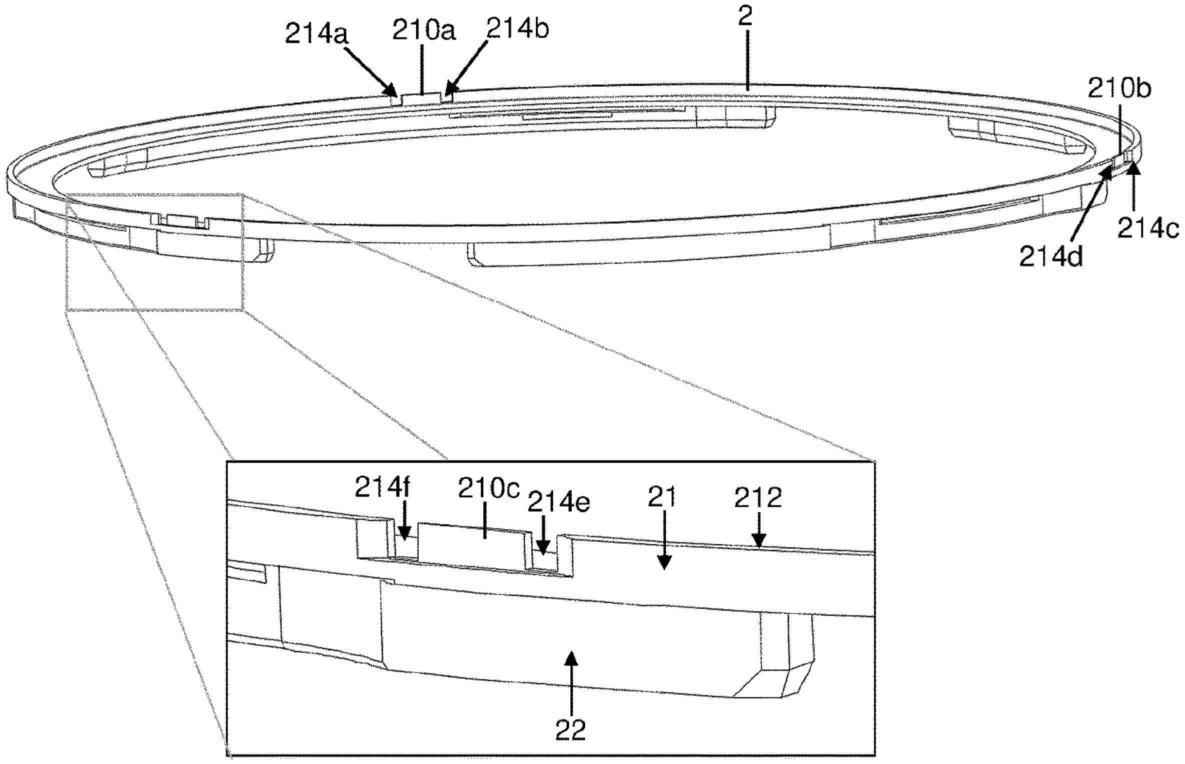
FIG. 5 is a perspective view of a dial connecting ring of the first embodiment.

In the embodiment depicted, the tongues 210 are three in number (more particularly visible in FIG. 5). The tongues are distinguished from one another by the references 210*a*, 210*b*, 210*c*. The tongues 210*a*, 210*b*, 210*c* are respectively intended to collaborate with the third surfaces 110*a*, 110*b*, 110*c* of the peripheral contour 11 of the dial plate 1 (these being more particularly visible in FIG. 3). Of course, the number of tongues may differ according to the anticipated force of retention of the dial plate on the connecting ring and/or according to construction requirements.

The tongues 210*a*, 210*b*, 210*c* may be obtained directly by machining the connecting portion 21. More particularly, each of the tongues may be formed or delimited by a set of slots 214*a*, 214*b*, 214*c*, 214*d*, 214*e*, 214*f* machined actually into the connecting portion 21. The sets of slots are arranged on either side of each of said tongues. These slots open onto a horizontal or substantially horizontal surface 212 parallel or substantially parallel to the support surface 211, which constitutes one end of the connecting portion 21 in the vertical direction z. Thus, the slots form crenelations actually within the connecting portion 21.

Figure 6:
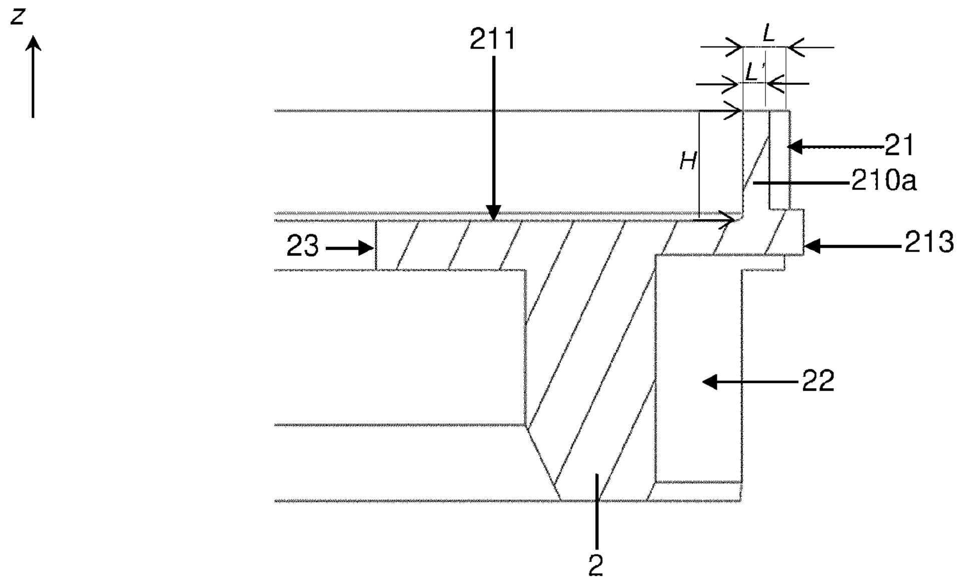
FIG. 6 is a partial view in axial section of a dial connecting ring of the first embodiment.

Furthermore, the width or thickness L' of the tongues, in a cross section passing through a plane perpendicular to the support surface 211, is preferably less than the width or thickness L of the portion 21 in this same cross section, as depicted in FIG. 6. More preferably still, the width L' is less than L/2.

The tongues 210*a*, 210*b*, 210*c*, on account of their width L' and the slots adjoining each of the tongues, are thus shaped to be plastically deformable in a direction perpendicular to the respective surfaces 110*a*, 110*b*, 110*c* of the dial plate 1. This direction is indicated schematically for example by a thick arrow in FIG. 2.

Figure 4:
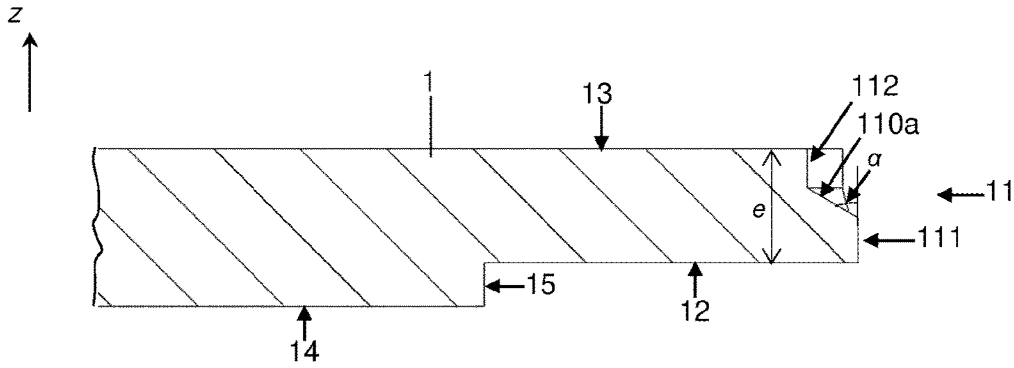
FIG. 4 is a partial view in axial section of a dial plate of the first embodiment.

As indicated previously, as a preference, the surfaces 110*a*, 110*b*, 110*c* extend in a direction not perpendicular to said first surface 12 and are inclined, notably inclined toward the inside of the dial plate 1, from said first surface 12. More particularly, as depicted in FIG. 4, the surfaces 110*a*, 110*b*, 110*c* are advantageously positioned between surfaces 111 and 112 extending perpendicular to the first surface 12 and to the second surface 13, from the ends of the contour 11. Such shaping advantageously allows the tongues to be housed in a thickness e of the dial plate, once these tongues have been plastically deformed.

As a preference, the surfaces 110*a*, 110*b*, 110*c* form an angle $\alpha$ with the surface 111 or the axis A, where $\alpha$ is preferably comprised between 20° and 70°, for example equal to 60°. In other words, the at least one third surface 110 is inclined by an angle $\alpha$ with respect to a straight line perpendicular to the lower first surface 12 and/or with respect to a straight line perpendicular to the upper second surface 13 of the dial plate 1, where a is comprised between 20° and 70°, and for example $\alpha$ is equal to 60°.

Moreover, the surfaces 110*a*, 110*b*, 110*c* extend at an angle $\beta$ in the plane of the dial plate 1, which angle is measured from the axis A, where $\beta$ is preferably less than 45°, or even preferably less than 20°. As a preference, these surfaces 110*a*, 110*b*, 110*c* thus allow for angular indexing between the plate 1 and the ring 2. As a further preference, these surfaces 110*a*, 110*b*, 110*c* are equally distributed about the axis A. Alternatively, these surfaces 110*a*, 110*b*, 110*c* are not equally distributed about the axis A, so that they constitute error proofing means when the dial plate is being positioned on the connecting ring. In other words, the third surfaces are formed in notches 113 made in the peripheral contour of the plate.

As an alternative, the angle $\beta$ may of course be 360°, to form just one single surface 110 on the contour 11 of the dial plate 1.

The plate 1 may thus be mounted bearing against the surface 211 of the ring, under the effect of the plastic deformation of the tongues 210*a*, 210*b*, 210*c*, as depicted. Advantageously, the plate 1 may also comprise a surface or land 15 perpendicular to the first and second surface and defining for example $\alpha$ second contour of said plate, positioned between the first surface 12 and another lower surface 14. This surface 15 may thus collaborate with minimal clearance with a vertical surface or opening 23 of the ring 2, so as to guide the dial plate 1 into the ring. Thus, the function of fixing the plate 1 to the ring 2, which is performed by the tongues 210*a*, 210*b*, 210*c* and the surfaces 110*a*, 110*b*, 110*c* belonging to the ring 2 and to the dial plate 1 respectively, can be dissociated from the function of guiding, which is performed by the surfaces 23 and 15 of the ring 2 and of the dial plate 1 respectively.

Advantageously, the surface 212 of the portion 21 of the ring 2 may be intended to react axial force, notably axial shock. In particular, the surface 212 may be a surface parallel to the first and second surfaces 12 and 13 and intended to come into abutment against a surface of the case middle of the timepiece. Once the dial 10 is assembled in the timepiece case, the surface 212 of the ring 2 may, for example, be concealed by a flange of the case middle. As a preference, the surface intended to collaborate through contact with the surface 212 is formed under the flange of the case middle. Advantageously also, the ring 2 may comprise a surface 213 perpendicular or substantially perpendicular to the first and second surfaces 12 and 13 and which is intended to collaborate with a surface of the case middle that is perpendicular or substantially perpendicular to the first and second surfaces 12 and 13. Thus, guidance of the dial 10 into the timepiece case may be performed directly between the dial 10 and the case. A solution such as this is therefore particularly advantageous to the precision of assembly of a dial in the timepiece case, thus making it possible to reduce the buildup of tolerances involved in assembly.

Figure 7:
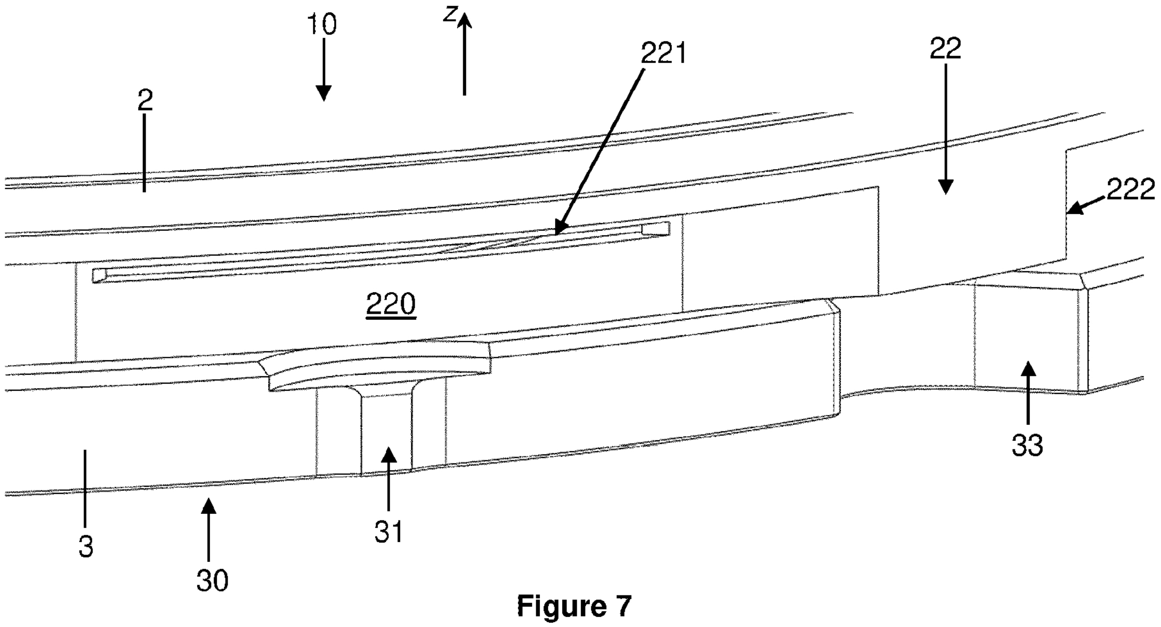
FIG. 7 is a partial perspective view of a dial of the first embodiment, the dial being positioned near a timepiece movement blank.
Figure 8:
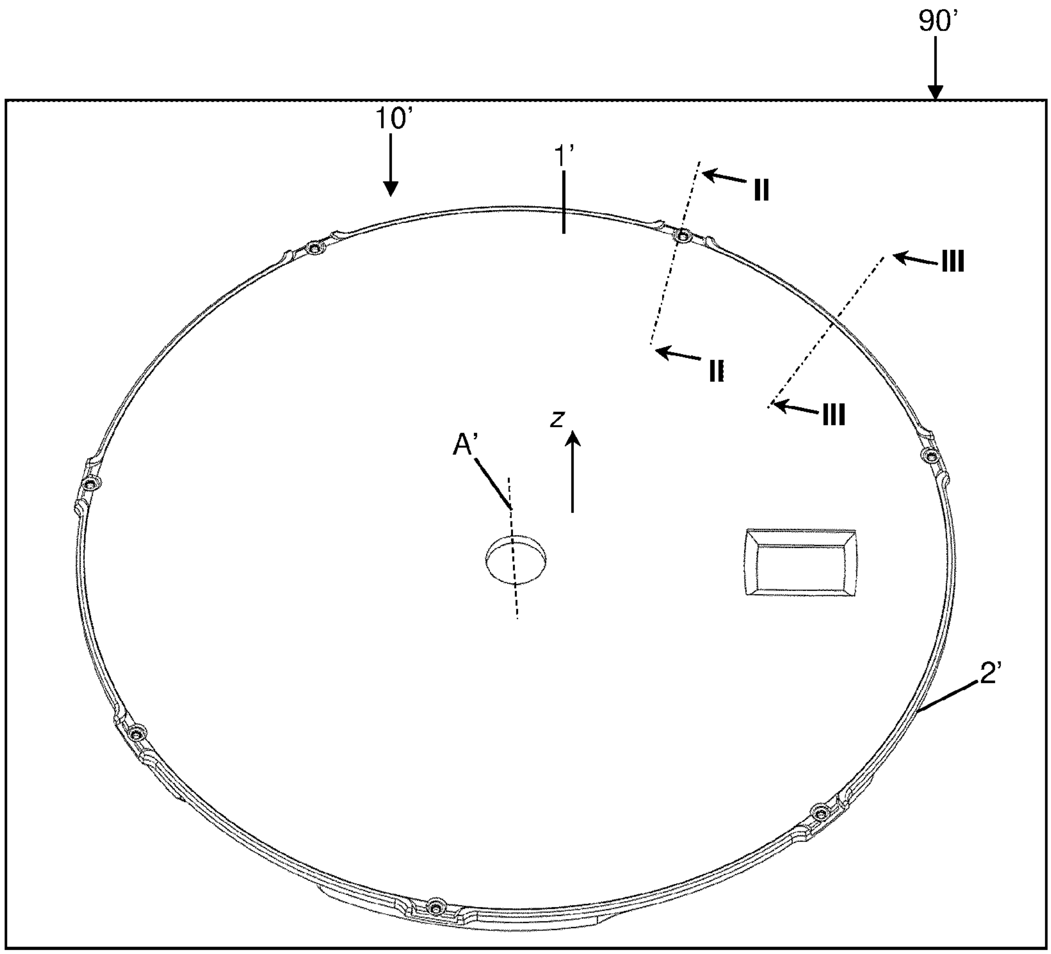
FIG. 8 is a view of a second embodiment of a timepiece.

Furthermore, the dial ring 2 also has the advantage of allowing said dial to be assembled on the timepiece movement 30 without assembly screws or feet for which spaces need to be provided on the upper surface of said movement. To achieve this, the ring 2 advantageously comprises a skirt 22 preferably comprising at least one elastic element 220 as depicted in FIG. 7. As a preference, this elastic element 220 extends partially over the height of the skirt 22. In the manner of the dial assembly device described in patent application EP 2743783, this elastic element 220 is more particularly shaped to collaborate with a protuberance 31 projecting from the periphery of a movement blank 3 of the movement 30. This elastic element 220 may, for example, take the form of a blade embedded at both ends and oriented tangentially relative to an axis in an axial direction. To achieve this, this elastic element 220 may be shaped by a slot 221 formed on the skirt 22. As a preference, the skirt 22 comprises three elastic elements 220. As a preference, these three elements are equally distributed about the axis A of the dial. The dial may thus be mounted or clipped onto the movement 30, particularly onto the movement blank 3, by deformation of the elastic elements upon contact with the protuberances 31.

Optionally, the skirt 22 of the connecting ring 2 also comprises a surface 222 oriented perpendicular or substantially perpendicular to the first and second surfaces. This surface 222 is intended to come into abutment against a surface 33 of the movement blank 3 that is oriented likewise perpendicular or substantially perpendicular to the first and second surfaces. The function of these elements is to ensure angular indexing of the dial on the movement blank. Alternatively or in addition, the connecting ring 2 may collaborate directly with a case middle or any component of the timepiece to allow angular positioning of the dial 10 within the timepiece.

A second embodiment of a timepiece 90' is described hereinafter with reference to FIGS. 8 to 13.

The timepiece 90' is, for example, a watch, particularly a wrist watch.

The timepiece 90' comprises a timepiece movement 30' and a timepiece dial 10' that are intended to be mounted in a timepiece case in order to protect them from the external environment.

The timepiece movement 30' may be an electronic movement or a mechanical movement, notably an automatic movement.

The timepiece dial 10' comprises a dial plate 1' and a connecting ring 2' for connecting the dial 10'. The dial plate 1' is assembled on the connecting ring 2' by riveting and/or by setting. The connecting ring 2' is intended to connect the dial plate 1' to the movement 30', particularly to a movement blank 3' of the movement 30'.

The dial plate 1' and the connecting ring 2' are shaped to be mechanically connected or fixed to one another. In other words, the dial plate 1' and the connecting ring 2' are preferably shaped to be connected as a built-in connection or a complete connection.

The connecting ring in other words constitutes a connecting support or a connecting interface between the movement and the dial plate.

What we mean by a "mechanical connection" is any connection performed independently of a step of bonding, welding or else brazing, which may prove tricky and difficult to reproduce.

The connecting ring 2' for a dial 10' of a timepiece 90' comprises a connecting first portion 21' provided with connecting elements 210' that are plastically deformable and intended to come to bear against a second portion 11' formed on the dial plate 1'.

As for the dial plate 1' for a dial 10' of a timepiece 90', this is intended to be mounted on the connecting ring 2'. The dial plate comprises:

- a lower first surface 12', intended to be positioned on the inward side of the timepiece 90',
- an opposite upper second surface 13' intended to be visible,
- a second portion 11' connecting the first and second surface and forming a peripheral contour of the dial plate.

The second portion 11' comprises at least a third surface 110' that is inclined with respect to the lower first surface 12' and/or with respect to the upper second surface 13' of the dial plate 1'. The at least one third surface 110' is designed to collaborate with connecting elements 210' that are plastically deformable and intended to come to bear against the at least one third surface 110'.

The timepiece dial has an axis A'. This axis is an axis of revolution or of symmetry of the dial. The axis A' is oriented in a direction z' perpendicular to the dial plate. If the dial has a shape that is not symmetrical or of revolution, the axis A' passes through the center of the dial (defined by a center of mass). If the dial plate is non planar, the direction z' and the axis A' are perpendicular to a plane passing through the lower first surface or the upper second surface. For example, such a plane may be tangential to the lower first surface or to the upper second surface. For example, such a plane may pass through the periphery of the lower first surface or through the periphery of the upper second surface.

The bearing of the plastically deformable connecting elements 210' against the second portion 11' formed on the dial plate 1', particularly on the at least one third surface 110', makes it possible to achieve mechanical connection of the plate to the connecting ring.

More specifically, the connecting portion 21' is provided with connecting elements 210' intended to come to bear against third surfaces 110' formed on the peripheral contour 11' of the dial plate 1'. The peripheral contour 11' may be defined as being a surface connecting the first surface 12' that is intended to be positioned on the inward side of a timepiece and an opposite upper second surface 13' that is intended to be visible by the wearer of the timepiece.

For example, the third surfaces 110' may extend in a direction not perpendicular to the first surface 12' and are inclined toward the inside of the dial plate 1' from said first surface 12'. In other words, progression along the third surfaces 110' with increasing distance away from the first surface 12' and/or with decreasing distance away from the second surface 13', decreases the distance from the axis A' or from the center of the first surface 12' or decreases the distance from the axis A' or from the center of the second surface 13' (this decrease being measured parallel to the first surface 12' or parallel to the second surface 13').

The third surfaces are inclined, which is to say that the directions normal to at least portions of these surfaces are neither parallel nor perpendicular to the axis A'.

In the second embodiment, the connecting elements 210' of the ring 2' take the form of feet 210'. In particular, the feet may be bored and/or shaped so as to be deformed by the formation of a riveted joint, as illustrated by the thick arrow in FIG. 9 which indicates a mechanical plastic-deformation action.

Figure 9:
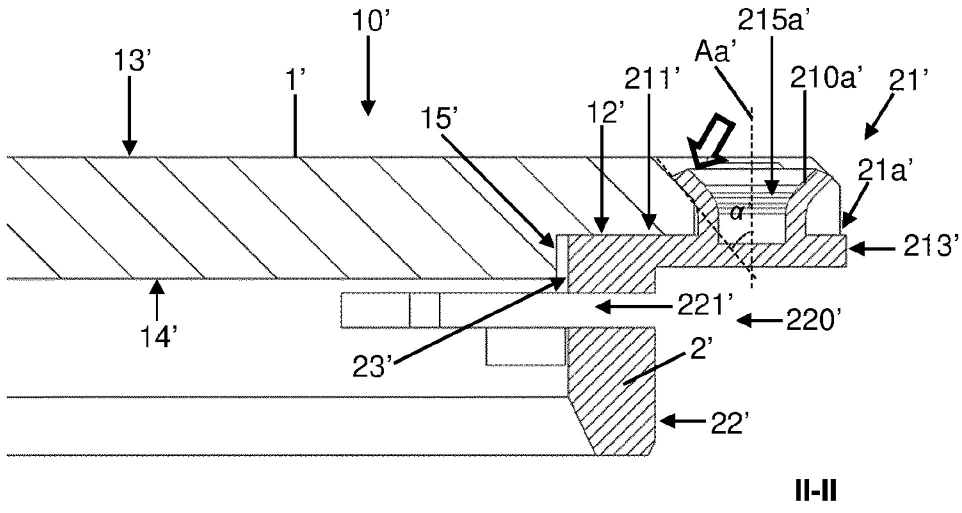
FIG. 9 is a first detailed view in axial section of a dial of the second embodiment.
Figure 12:
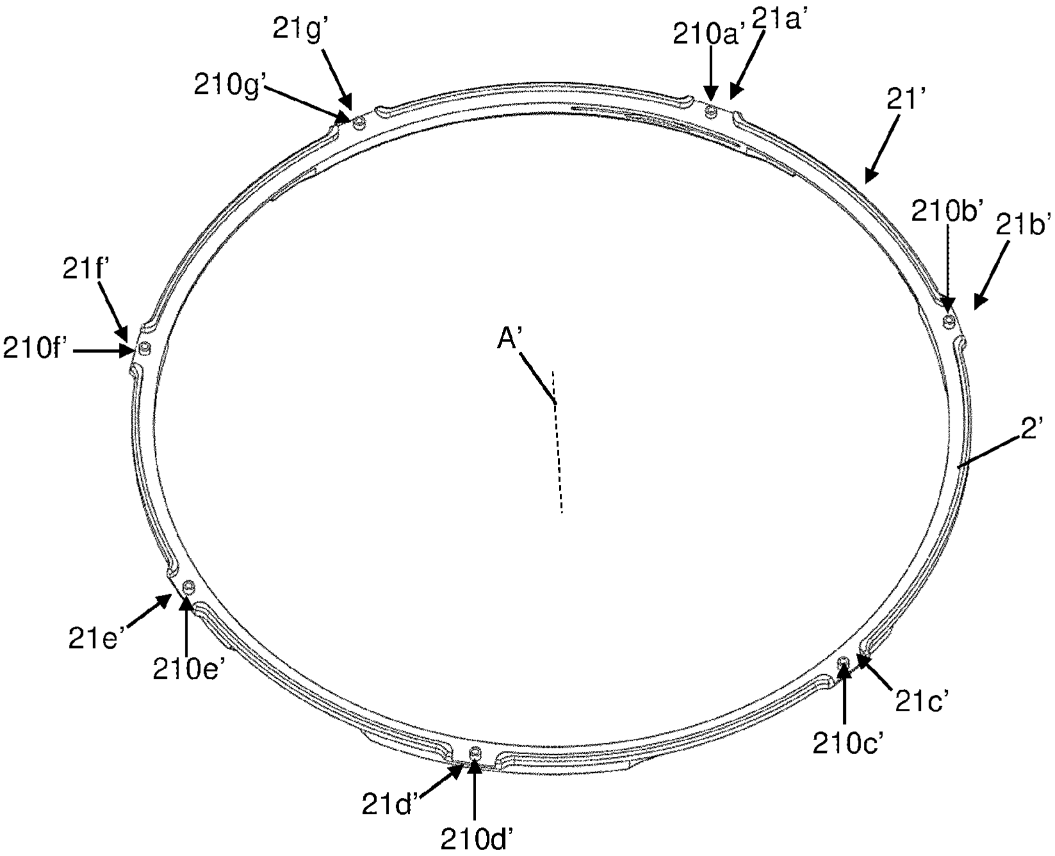
FIG. 12 is a perspective view of a dial connecting ring of the second embodiment.

In the embodiment of FIGS. 8 to 13, the feet are seven in number and referenced **210*a*', 210*b*', 210*c*', 210*d*', 210*e*', 210*f*', 210*g*', as depicted in FIG. 12. The feet are formed on lobes or lugs 21*a*', 21*b*', 21*c*', 21*d*', 21*e*', 21*f*', 21*g*' of the connecting portion 21', projecting toward the outside of the ring 2' in the plane of a horizontal or substantially horizontal surface 211' intended to have a lateral part or peripheral part of the lower first surface 12' of the dial plate 1' bearing against it or in a plane parallel to the plane of a horizontal or substantially horizontal surface 211' intended to have a lateral part or peripheral part of the lower first surface 12' of the dial plate 1' bearing against it. Furthermore, these feet each project from the surface 211' toward the outside of the dial in a vertical direction z or in a direction substantially parallel to the direction z. As a preference, these feet each comprise an opening so as to minimize the thickness of material forming the foot and/or so that a tool can be inserted into said opening so that it can plasticize the walls of the feet and thus ensure that the feet 210*a*', 210*b*', 210*c*', 210*d*', 210*e*', 210*f*', 210*g*' can be pressed firmly against the respective surfaces 110*a*', 110*b*', 110*c*', 110*d*', 110*e*', 110*f*', 110*g*' of the dial plate 1' as depicted in FIG. 9. Thus, as a preference, the feet 210*a*', 210*b*', 210*c*', 210*d*', 210*e*', 210*f*', 210*g*' each comprise an opening 215*a*', 215*b*', 215*c*', 215*d*', 215*e*', 215*f*', 215*g*'**. As a preference, the openings are coaxial with each of the feet. As a preference, the feet are cylindrical and notably each take the form of a hollow cylinder. The feet are thus preferably deemed to be rivets.

By way of example, FIG. 9 depicts a view in cross section of the dial in the region of a foot **210*a*' of axis Aa' which is positioned on a lobe 21*a*' formed on the connecting portion 21' of the ring 2**.

As a preference, the surfaces **110*a*', 110*b*', 110*c*', 110*d*', 110*e*', 110*f*', 110*g*' of the dial plate 1' are each arranged on lobes or lugs 11*a*', 11*b*', 11*c*', 11*d*', 11*e*', 11*f*', 11*g*' projecting toward the outside of the plate 1' in a plane parallel to that of the surface 12' and/or 13' of the plate 1' or in the plane of the surface 12' and/or 13' of the plate 1'**.

As a preference, the surfaces **110*a*', 110*b*', 110*c*', 110*d*', 110*e*', 110*f*', 110*g*' are generated by circle portions or are cone portions. Alternatively, the surfaces 110*a*', 110*b*', 110*c*', 110*d*', 110*e*', 110*f*', 110*g*' take the form of circles or cones. As a further preference, these surfaces are inclined and form an angle α' with their respective axes Ai'. By way of example, FIG. 9 illustrates a defined angle α' of the order of 45°. The angle is measured between a generatrix of the inclined surface 110*a*' and the axis Aa' or between a generatrix of the inclined surface 110*a*' and the axis A' perpendicular to the first surface 12' or perpendicular to the first surface 13'**. The angle α' may be comprised between 20° and 70°. For example α' may be equal to 45° or to 60°.

As a preference, the lobes **11*a*', 11*b*', 11*c*', 11*d*', 11*e*', 11*f*', 11*g*' extend at an angle β' in the plane of the dial plate 1'**, with β', which is measured from the axis A', preferably being less than 20°, or even preferably less than 10°.

The lobes of the plate 1' and/or of the ring 2' may be equally distributed or unequally distributed about the axis A'.

Figure 10:
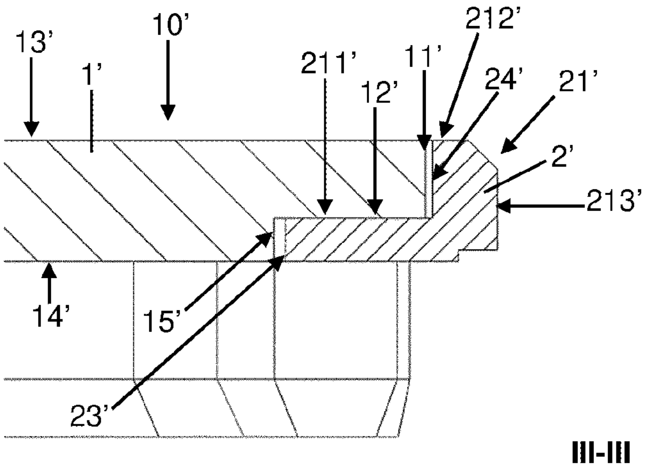
FIG. 10 is a second detailed view in axial section of a dial of the second embodiment.
Figure 11:
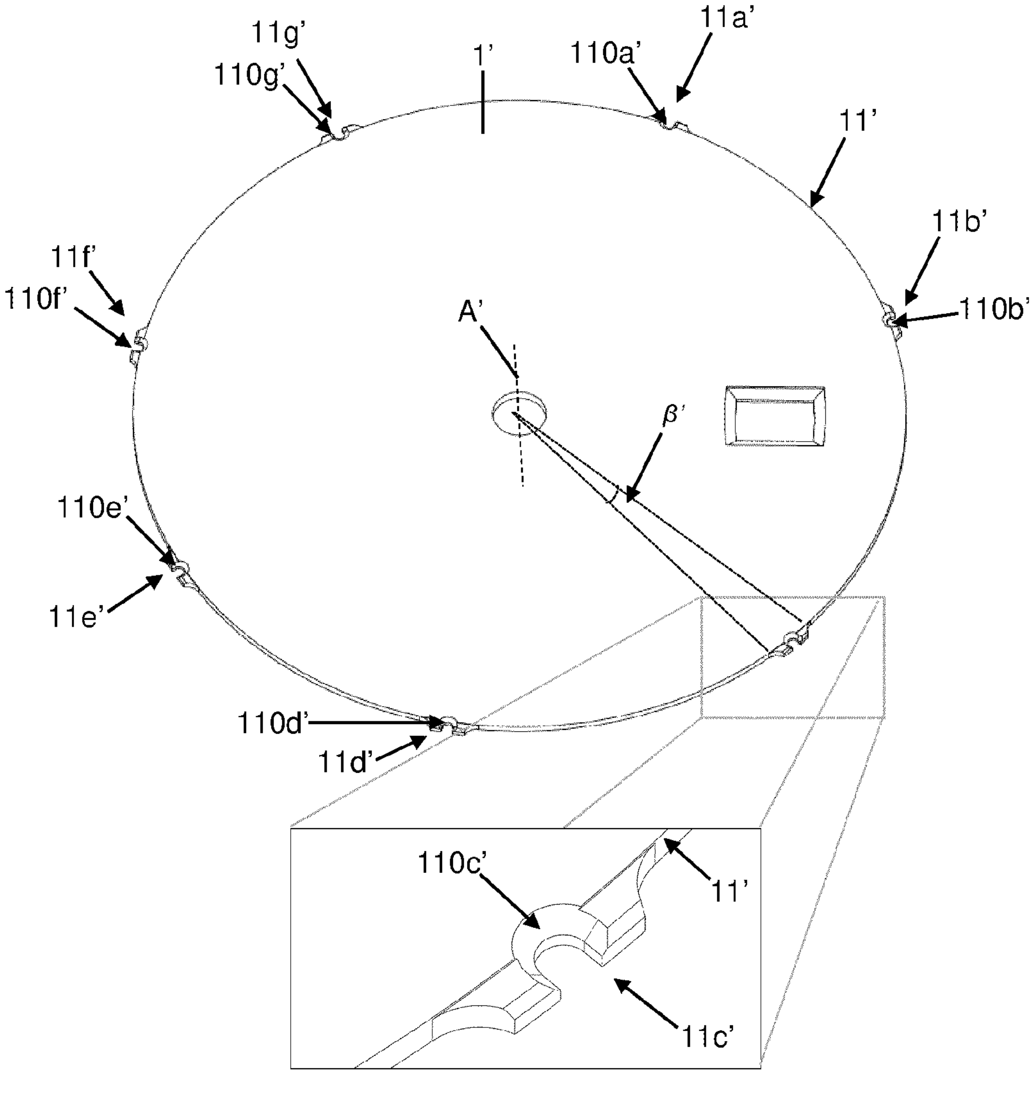
FIG. 11 is a perspective view of a dial plate of the second embodiment.

As a preference, the dial plate 1' is guided with minimal clearance into the connecting ring 2' via the contour 11' of the plate 1', which is intended to collaborate with a guide surface 24' of the connecting portion 21' of the ring 2' as depicted in FIG. 10. Alternatively or in addition, other respective surfaces 15' and 23' of the plate 1' and of the ring 2' may perform this guidance function.

In addition to the plastic-deformation elements that take the form of feet, the ring 2' comprises a skirt 22' comparable to the skirt 22 of the ring 2 of the first embodiment. The skirt 22' thus comprises at least one elastic element 220' extending partially over the height of the skirt 22'. This elastic element 220' may, for example, take the form of a blade embedded at both ends and oriented tangentially relative to an axis in an axial direction. To achieve this, this elastic element 220' may be shaped by a slot 221' formed on the skirt 22'. As a preference, the skirt 22' comprises three elastic elements 220'. As a preference, these three elements are equally distributed about the axis A' of the dial 10'.

As with the ring of the first embodiment, the ring 2', particularly the connecting portion 21', may also comprise a horizontal or substantially horizontal surface 212' visible in FIG. 10 which may be intended to react axial force, notably axial shock. In particular, this surface 212' may be intended to come into abutment against a surface of the case middle of the timepiece. Once the dial 10' has been assembled into the timepiece case, the surface 212' of the ring 2' may, for example, be concealed by an upstand of the case middle. As a preference, the surface intended to collaborate with the surface 212' is formed under the upstand of the case middle.

The ring 2' may moreover comprise a vertical or substantially vertical surface 213' which is intended to collaborate with a vertical or substantially vertical surface of the case middle. Thus, the guidance of the dial 10' into the timepiece case can be performed directly between the dial 10' and the case. Such a solution is therefore particularly advantageous in terms of the precision of assembly of a dial within a timepiece case, thus making it possible to reduce the buildup of tolerances involved in the assembly.

Figure 13:
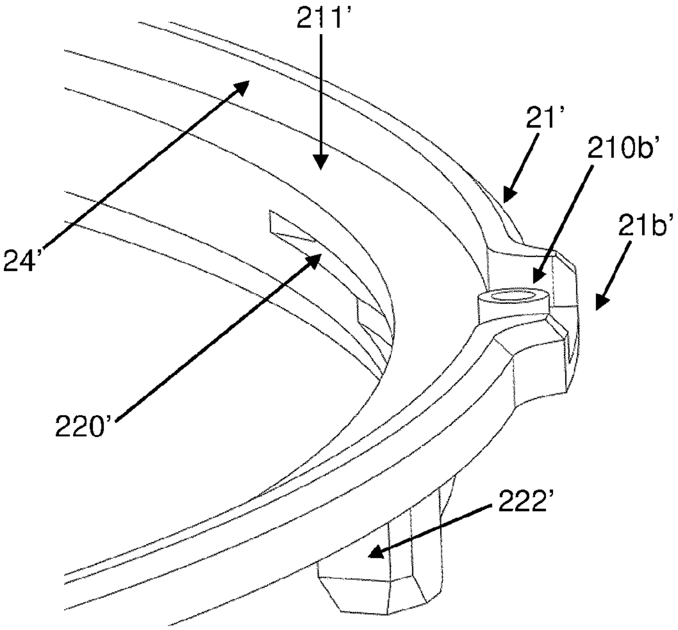
FIG. 13 is a partial perspective view of a detail of a dial connecting ring of the second embodiment.

Optionally, the skirt 22' of the connecting ring 2' also comprises a surface 222' oriented vertically or substantially vertically and depicted in FIG. 13, which is intended to come into abutment against a surface of a movement blank likewise oriented vertically or substantially vertically.

A way of implementing a method for assembling or constructing a dial as described hereinabove or a timepiece as described hereinabove is described hereinafter.

The method comprises the following steps:

- supplying the dial plate 1; 1',
- supplying the connecting ring 2; 2',
- arranging the dial plate on the connecting ring,
- plastically deforming the connecting elements 210; 210'.

The plastic deformation is preferably achieved by applying mechanical actions to the connecting elements. These mechanical actions may be applied by a watchmaker using a tool. The tool may be a setting or riveting tool or a riveting hammer.

Whatever the embodiment, the dial plate advantageously has the shape of a disk centered on an axis A, A'. Of course, the dial plate may be non-circular. For example, the dial plate may be polygonal, square or rectangular. Moreover, the dial plate may or may not be planar.

Whatever the embodiment, the solution for creating the dial is advantageously envisioned to allow a dial plate 1, 1' to be assembled that may be based on ceramics, notably a zirconia or an alumina, a fluorescent and/or phosphorescent ceramic, or a ceramic composite based on yttrium-stabilized zirconia and Dy/Eu-doped strontium aluminate. The plate may notably advantageously be made of "luminescent zirconia", for example as described in patent application EP2730636. As an alternative, the plate 1 may be based on a composite material. As a further variant, it may be based on a stone, notably onyx, opal, turquoise, sapphire or based on mother-of-pearl. As a preference, the Vickers hardness of such a dial plate is greater than 600 HV, or even greater than 700 HV, or even greater than 800 HV.

Whatever the embodiment, the connecting ring 2, 2' for its part is preferably made of metal or metal alloy. It may be manufactured in brass. Alternatively, it may be manufactured in gold alloy. As a preference, the Vickers hardness of such a ring is less than 180 HV or even less than 150 HV or even less than 100 HV. As a further alternative, the connecting ring 2, 2' may be made of steel, notably of Nivaflex®.

Whatever the embodiment, as a preference, a ratio of Vickers hardnesses between the material selected for the dial plate and the one selected for the connecting ring is greater than 3, or even greater than 4, or even greater than 5.

Whatever the embodiment, thanks to the solid nature of the dial plate 1; 1', the dial 10; 10' has the advantage of not requiring a supporting plate arranged under the entirety of the surface of the dial plate. It is therefore possible to offer various aesthetic variations of a solid dial plate by applying a layer of varnish visible on and/or under said dial plate. By way of example, the lower surface 14; 14' of the dial plate 1; 1', made for example in "luminescent zirconia" may be coated with a layer of varnish having a fluorescent and/or phosphorescent property so as to modulate the daytime and/or nighttime appearance of said dial. As an alternative to a layer of varnish, it may also be conceivable to apply a second solid plate having a fluorescent and/or phosphorescent property between the plate 1 and the dial ring 2 or under the plate 1.

Whatever the embodiment, the dial plate and the connecting ring are configured and/or arranged in such a way that after the plastic deformation of the plastically deformable connecting elements 210; 210', the plastically deformable connecting elements 210; 210' do not protrude beyond the upper second surface 13; 13'.

Whatever the embodiment, the dial plate does not form part of the connecting ring and the connecting ring does not form part of the dial plate.

Thanks to the solutions described hereinabove it is possible to fix a dial plate made of a fragile material reliably and repeatably by riveting or setting.

The solutions described above are suitable for any type of dial-plate material, more particularly for a fragile material such as a ceramic.

Thanks to the solutions described above, it is possible to combine simple manufacture, user-friendly integration into a timepiece compatible with all timepieces, including wrist watches which have a very small volume available.

The solutions described above make it possible to achieve reliable and robust fixing of the dial to a movement blank or a case of a timepiece.

Throughout this document, "horizontal" means perpendicular to the axis A; A'.

Throughout this document, "vertical" means parallel to the axis A; A'.

The invention claimed is:

1. A dial for a timepiece, the dial comprising a dial plate assembled with a connecting ring, the dial plate comprising:

a lower first surface intended to be positioned on the inward side of a timepiece, an opposite upper second surface intended to be visible, a second portion connecting the first and second surface and forming a peripheral contour of the dial plate, wherein the second portion comprises at least a third surface that is inclined with respect to the lower first surface and/or with respect to the upper second surface of the dial plate, the at least one third surface being designed to collaborate with connecting elements that are plastically deformable and intended to come to bear against the at least one third surface, and the connecting ring comprising a connecting first portion provided with connecting elements that are plastically deformable and that bear against the second portion formed on the dial plate, wherein a ratio of a Vickers hardness of a material of which the dial plate is made to a Vickers hardness of a material of which the connecting ring is made is greater than 3.

2. The dial as claimed in claim 1, wherein the at least one third surface is inclined by an angle $\alpha$ with respect to the lower first surface and/or with respect to the upper second surface of the dial plate, where $\alpha$ is comprised between 20° and 70°.

3. The dial as claimed in claim 1, wherein the at least one third surface comprises several surfaces formed in notches made in the second portion of the plate.

4. The dial as claimed in claim 1, wherein the at least one third surface comprises at least a frustoconical surface.

5. The dial plate as claimed in claim 4, wherein the at least one frustoconical surface is formed in a lug or lobe projecting from a peripheral contour of the plate.

6. The dial as claimed in claim 1, wherein the plate is made from a ceramic-based material, and/or the plate is made of a material based on a composite material, and/or the plate is based on a stone, or based on mother-of-pearl, and/or the plate has a Vickers hardness higher than 600 HV.

7. The dial plate as claimed in claim 6, wherein the plate is made from a ceramic-based material which is:

a zirconia an alumina, a fluorescent ceramic and/or a phosphorescent ceramic, a composite ceramic based on yttrium-stabilized zirconia and Dy/Eu-doped strontium aluminate, or a luminescent zirconia.

8. The dial as claimed in claim 1, wherein the dial plate and the connecting ring are configured and/or arranged so that after plastic deformation of the plastically deformable connecting elements, the plastically deformable connecting elements do not extend beyond the upper second surface.

9. A timepiece comprising a dial as claimed in claim 1.

10. A method of assembling the dial as claimed in claim 1, the method comprising:

providing the dial plate, providing the connecting ring, placing the dial plate on the connecting ring, plastically deforming the connecting elements.

11. A dial plate for a dial of a timepiece and which is intended to be mounted on a connecting ring, the dial plate comprising:

a lower first surface intended to be positioned on the inward side of a timepiece, an opposite upper second surface intended to be visible, a second portion connecting the first and second surface and forming a peripheral contour of the dial plate, wherein the second portion comprises at least a third surface that is inclined with respect to the lower first surface and/or with respect to the upper second surface of the dial plate, the at least one third surface being designed to collaborate with connecting elements that are plastically deformable and intended to come to bear against the at least one third surface, wherein the at least one third surface comprises at least a frustoconical surface, wherein the at least one frustoconical surface is formed in a lug or lobe projecting from a peripheral contour of the plate.

* * * * *